US009222407B2

(12) United States Patent
Moses et al.

(10) Patent No.: US 9,222,407 B2
(45) Date of Patent: Dec. 29, 2015

(54) DISPENSER FOR COMPRESSED NATURAL GAS (CNG) FILLING STATION

(71) Applicant: Wayne Fueling Systems LLC, Austin, TX (US)

(72) Inventors: Randy A. Moses, Perkasie, PA (US); Kent W. Robinson, Perkasie, PA (US)

(73) Assignee: Wayne Fueling Systems LLC, Austin, TX (US)

( * ) Notice: Subject to any disclaimer, the term of this patent is extended or adjusted under 35 U.S.C. 154(b) by 83 days.

(21) Appl. No.: 13/939,820

(22) Filed: Jul. 11, 2013

(65) Prior Publication Data

US 2014/0130901 A1 May 15, 2014

Related U.S. Application Data

(60) Provisional application No. 61/725,366, filed on Nov. 12, 2012.

(51) Int. Cl.
*F17C 13/00* (2006.01)
*B60S 5/02* (2006.01)
(Continued)

(52) U.S. Cl.
CPC . *F02B 43/00* (2013.01); *F17C 5/06* (2013.01); *F17C 2205/0107* (2013.01); *F17C 2205/0176* (2013.01); *F17C 2205/037* (2013.01); *F17C 2205/0326* (2013.01); *F17C 2221/035* (2013.01); *F17C 2223/0123* (2013.01); *F17C 2225/01* (2013.01); *F17C 2225/0123* (2013.01); *F17C 2250/032* (2013.01); *F17C 2250/043* (2013.01); *F17C 2260/037* (2013.01);
(Continued)

(58) Field of Classification Search
CPC ............ B67D 7/08; B67D 7/20; B67D 7/565; B67D 7/32; B67D 7/84
USPC ...................... 222/23, 27, 52, 173; 141/59, 94
See application file for complete search history.

(56) References Cited

U.S. PATENT DOCUMENTS 3,756,291 A * 9/1973 McGahey ............ B67D 7/0482
141/290
4,576,312 A * 3/1986 Swick, Jr. ................ B67D 7/06
222/173

(Continued)

FOREIGN PATENT DOCUMENTS

DE 3022672 A1 12/1981
EP 1835222 A1 9/2007

OTHER PUBLICATIONS

PCT Search Report and Written Opinion issued Apr. 3, 2014 in connection with corresponding PCT Patent Application No. PCT/US2013/069369.

*Primary Examiner* — Paul R Durand
*Assistant Examiner* — Charles P Cheyney
(74) *Attorney, Agent, or Firm* — Mintz Levin Cohn Ferris Glovsky and Popeo, P.C.

(57) ABSTRACT

A fueling station dispenser for distributing a combustible gas that is lighter than air, and that includes electrical and gas handling sections in the same frame. A vapor barrier in the cabinet blocks fugitive gas that may be present in the gas handling section from entering the electrical section. According to most applicable codes, by isolating combustible gas from the electrical section gives it a Class I, Division 2 designation. Which eliminates the need to seal or air purge the electronics section as this designation allows for electronics that under normal intended operating conditions do not generate an arc with sufficient energy to initiate combustion.

18 Claims, 3 Drawing Sheets

(51) Int. Cl.
*F02B 43/00* (2006.01)
*F17C 5/06* (2006.01)

(52) U.S. Cl.
CPC .... *F17C 2260/042* (2013.01); *F17C 2265/063* (2013.01); *F17C 2265/065* (2013.01); *F17C 2270/0165* (2013.01); *F17C 2270/05* (2013.01); *Y10T 137/6851* (2015.04)

(56) References Cited

U.S. PATENT DOCUMENTS

| | | | |
|---|---|---|---|
| 4,986,445 A | | 1/1991 | Young et al. |
| 5,163,586 A | | 11/1992 | Zinsmeyer |
| 5,238,030 A | | 8/1993 | Miller et al. |
| 5,330,073 A | * | 7/1994 | Collins et al. .................. 222/52 |
| 5,569,151 A | | 10/1996 | Karwacki et al. |
| 5,717,564 A | * | 2/1998 | Lindale .......................... 361/600 |
| 5,867,403 A | * | 2/1999 | Sasnett et al. ................. 700/282 |
| 5,964,659 A | | 10/1999 | Hertzler et al. |
| 5,992,480 A | * | 11/1999 | Hussain ............... B67D 7/0478 |
| | | | 141/290 |
| 6,167,922 B1 | * | 1/2001 | Seitz ........................ B67D 7/84 |
| | | | 141/86 |
| 6,173,865 B1 | | 1/2001 | Loynes |
| 6,681,814 B1 | * | 1/2004 | Bartlett et al. .................. 141/94 |
| 6,786,250 B2 | | 9/2004 | Stanley |
| 6,935,191 B2 | * | 8/2005 | Olivier et al. ............... 73/861.79 |
| 7,028,561 B2 | * | 4/2006 | Robertson et al. ......... 73/861.79 |
| 7,254,463 B1 | | 8/2007 | Moore |
| 8,047,220 B2 | | 11/2011 | Grozinger et al. |
| 2001/0004909 A1 | * | 6/2001 | Pope .................... B67D 7/0486 |
| | | | 141/59 |
| 2002/0154068 A1 | | 10/2002 | Gromatzky et al. |
| 2003/0164202 A1 | | 9/2003 | Graham et al. |
| 2003/0230352 A1 | * | 12/2003 | Hart ..................... B67D 7/0486 |
| | | | 141/59 |
| 2009/0034232 A1 | | 2/2009 | Larsson et al. |
| 2011/0295415 A1 | | 12/2011 | Bartlett et al. |
| 2012/0205394 A1 | | 8/2012 | Larsson et al. |

\* cited by examiner

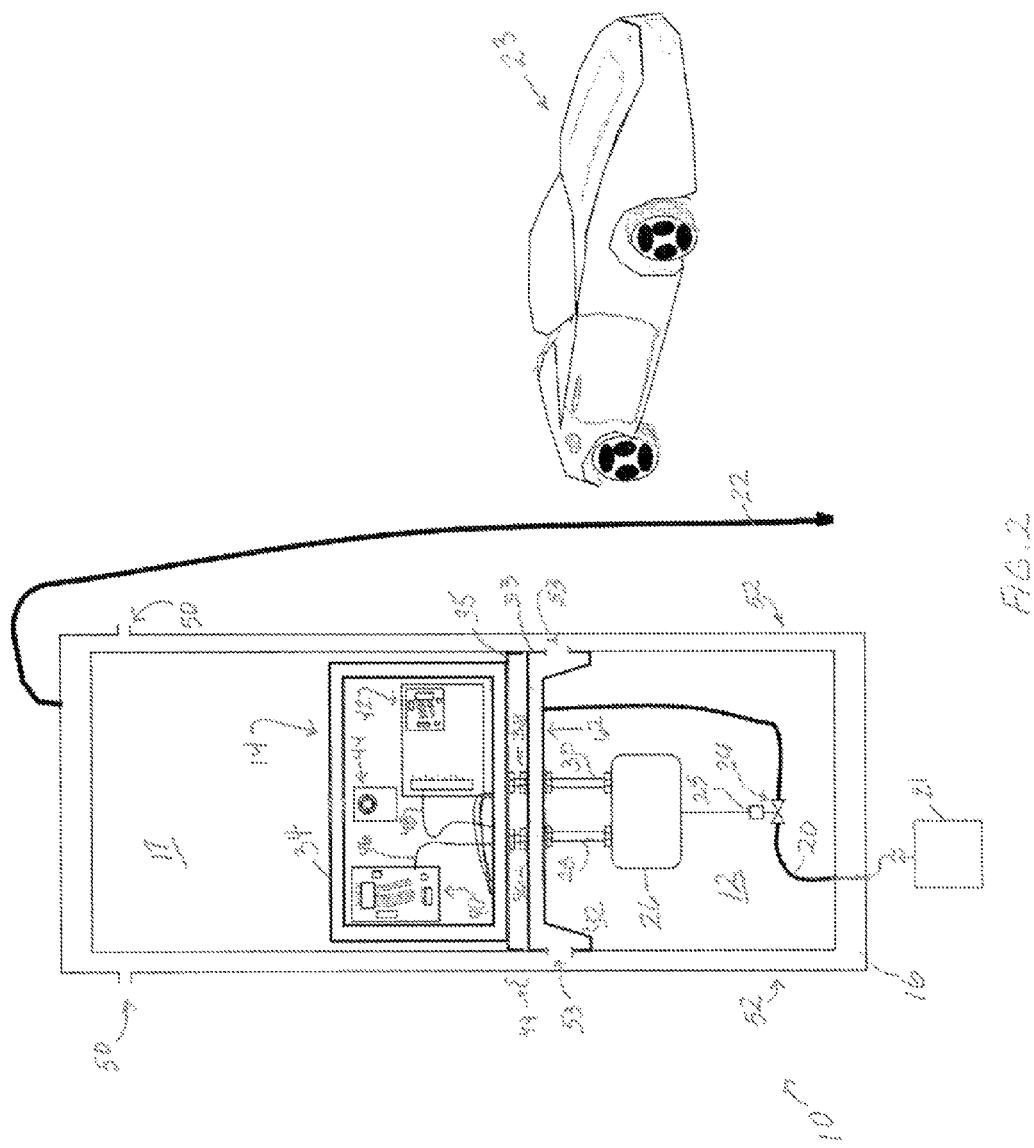

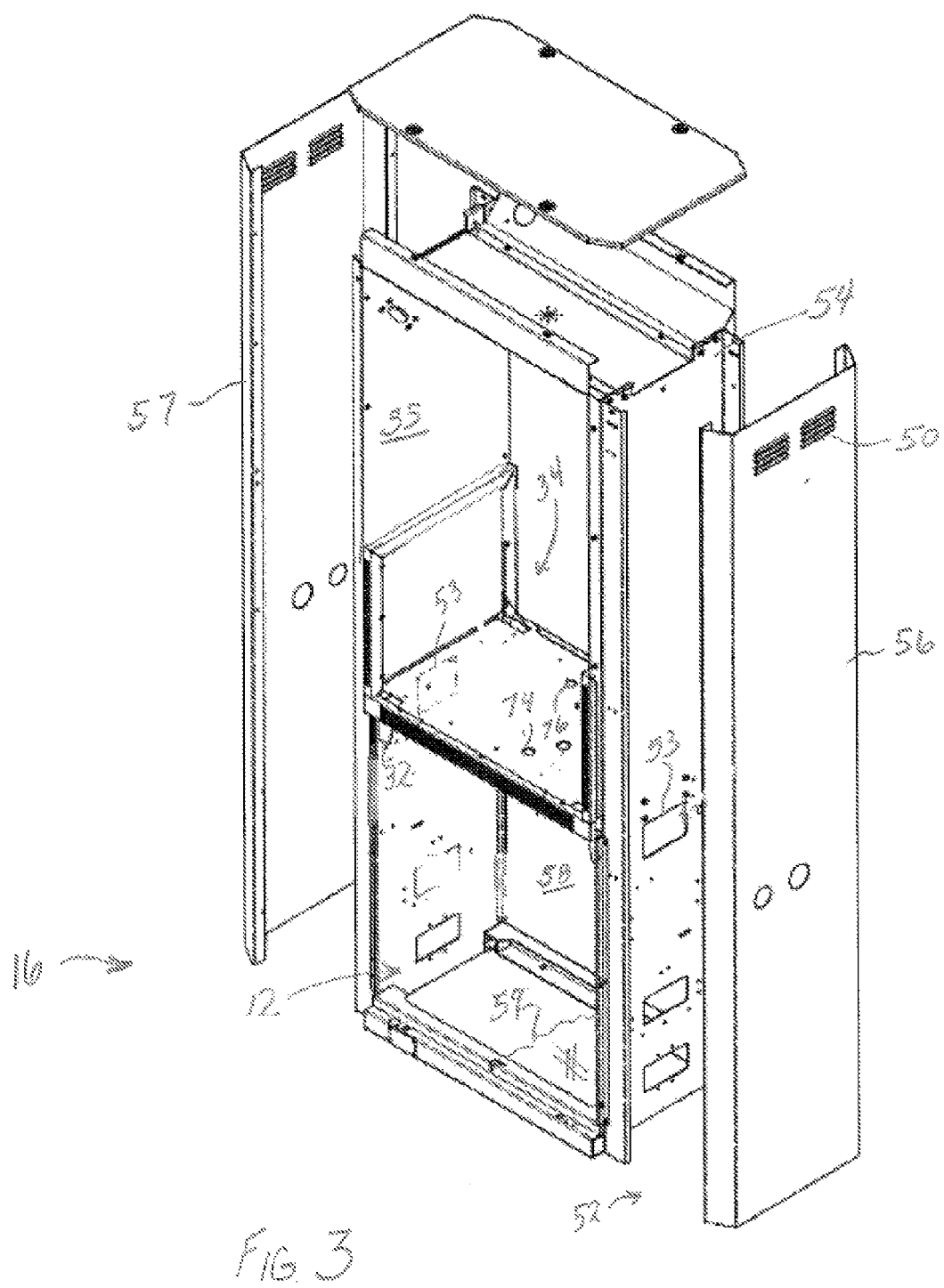

DISPENSER FOR COMPRESSED NATURAL GAS (CNG) FILLING STATION

CROSS REFERENCE TO RELATED APPLICATIONS

This application claims priority to and the benefit of U.S. Provisional Application Ser. No. 61/725,366, filed Nov. 12, 2012, the full disclosure of which is hereby incorporated by reference herein for all purposes.

BACKGROUND OF THE INVENTION

1. Field of Invention

The present disclosure relates in general to a device and method for dispensing fuels lighter than air, such as compressed natural gas (CNG). More specifically, the present disclosure relates to a gas dispenser having gas handling components and electronics in the same structure, and where the electronics are mounted in a non-purged housing spaced away from the gas handling components.

2. Description of Prior Art

Traditionally, vehicles have been fueled by one or more distillates of fuel oil, such as gasoline or diesel. Since these fuels have vapors that are heavier than air, the dispensers for these fuels were designed with the electronics located above the fuel-handling, hazardous area. This allowed the dispenser structure to be broken into different hazardous area classifications allowing electronics to be located in the structure with minimal safeguards from the flammable vapors below. Recently, a growing number of vehicles have been manufactured, or converted, to operate on compressed natural gas (CNG), which is lighter than air, instead of the heavier than air longer chain hydrocarbons. The availability, low cost, and lower emissions of combusting natural gas over fuel oil distillates have garnered interest in continuing to increase the number of natural gas powered vehicles. Similar to typical gasoline or diesel fueling dispensers, CNG fueling dispensers, whose structure contains piping and valves for delivering gas to a customer, have been designed using similar dispenser structures with the electronics, which control the dispenser and payment authorization terminals, above the gas handling components.

Standards for the safe handling of CNG have been published by national code recommending bodies. Many states have adopted these codes in their respective vehicle, transportation, and building regulations. As CNG is lighter than air, unlike gasoline or diesel vapors, CNG that may escape from the gas handling components can rise; and thus present different hazardous zones for a CNG dispenser as compared to a gasoline or diesel dispenser. As such, standards for CNG dispensers reflect a different hazardous zone rating as compared to gasoline or diesel dispensers in these standards. For example, explosive vapors may sometimes concentrate in spaces above a gas handling portion of a CNG dispenser having a traditional gasoline or diesel dispenser design. By most standards, the spaces normally having the explosive vapor concentration would be deemed Class I, Division 1, thus prohibiting any device capable of producing a spark. For example, applicable codes typically designate Class I locations to be where a flammable gas or vapor may be present in a sufficient amount to produce an explosion or ignitable mixture. Class I locations are sometimes designated as Division 1 when the flammable gas is likely to exist, such as in quantities sufficient to produce an explosive or ignitable mixture under normal operating conditions. Class I locations are sometimes designated as Division 2 when the flammable gas is not normally present in an explosive concentration, but accidentally exists. Some CNG dispensers having traditional gasoline or diesel dispenser structures address this change in hazardous rating by enclosing electronics in an explosion-proof junction box, including an Intrinsic Safe Barrier (ISB), or disposing electronics in an air purged enclosure protected through pressurization. There are some components used in payments terminals that either due to the need of accessibility to the customer or because of the type of component, cannot be adequately protected by an explosion-proof junction box or an ISB. When this is true, these components are normally protected by an air purge system. Correctly implemented, an air purge system can change the area within the enclosure to a non-hazardous, or unclassified area. Air purge systems can be affected by ambient pressure variations and wind. An air purge system also exposes the electronics to cold and/or moist air that can affect the operation of the components as well as corrode or damage them. It can also inject dirt into the system. The fans used for the source of air for air purge systems must be positioned in a location away from the hazardous area that is created by the dispenser, which increases installation costs and complexity.

SUMMARY OF THE INVENTION

Disclosed herein are embodiments of a dispenser for handling a combustible gas. In one embodiment the dispenser includes a frame, an electrical section, and a gas handling section. Further included in the frame is a vapor barrier that blocks fugitive gas from entering into the electronics section. Example vapor barriers include a bulkhead in the gas handling section, a bulkhead in the electronics section, a housing for electronics in the electrical section, and combinations thereof. Without the rating whereby an explosive mixture of gas normally is in the electronics section, electronics can be deployed that do not create an arc during their normal operation with sufficient energy to initiate combustion. Also optionally included is a vent system that includes side columns for venting fugitive gas from the gas handling section to ambient and that bypasses the electronics section.

BRIEF DESCRIPTION OF DRAWINGS

Some of the features and benefits of embodiments of the present invention having been stated, others will become apparent as the description proceeds when taken in conjunction with the accompanying drawings, in which:

FIG. 2 is a partial sectional view of the dispenser of FIG. 1 in accordance with the present disclosure;

FIG. 3 is a perspective view of a partial cut-away view of an example of a portion of the dispenser of FIG. 1 in accordance with the present disclosure; and While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION

Figure 1:
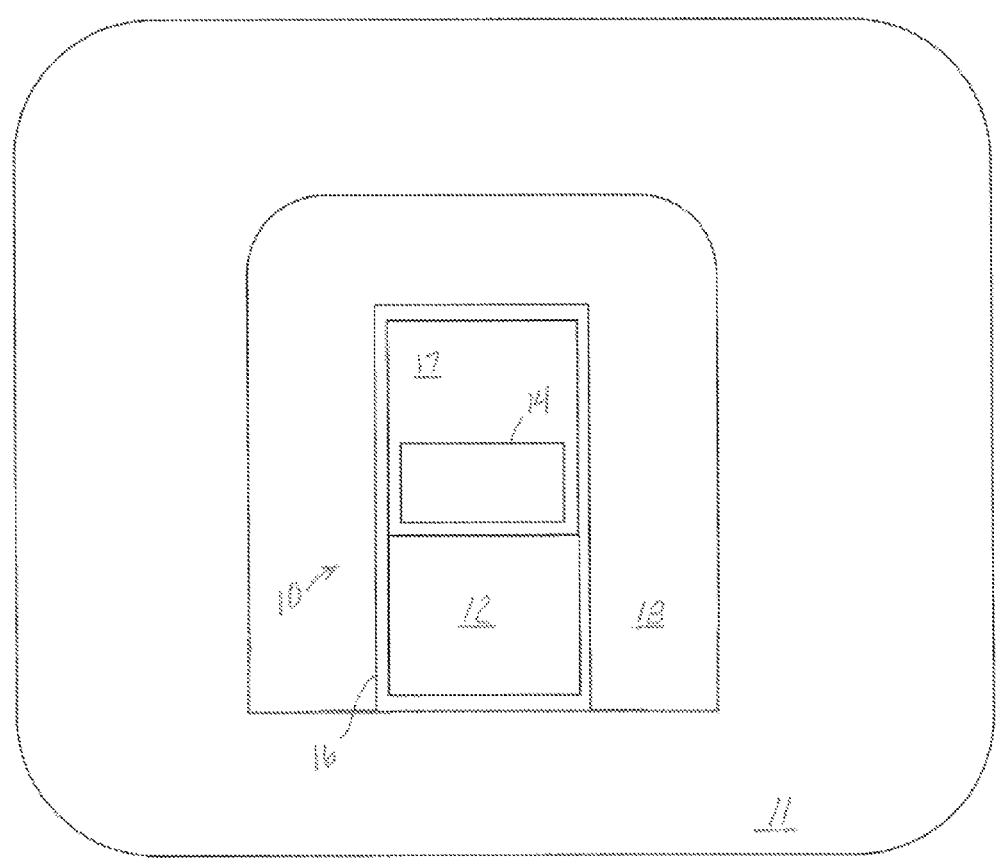
FIG. 1 is a schematic example of a dispenser for compressed natural gas illustrating safety code classifications of surrounding zones and in accordance with the present disclosure.

A method and system of the present disclosure will now be described more fully hereinafter with reference to the accompanying drawings in which embodiments are shown. Embodiments of the method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 schematically illustrates an example of a gas dispenser 10 in which a gas handling section 12 and electronics section 14 are housed in a frame 16. In the example of FIG. 1, the CNG dispenser 10 may be located at a fueling station 11 that offers retail or wholesale purchase of CNG. Optionally, the fueling station 11 can be onsite at a facility where all fuel dispensed is for use at or associated with the facility. Examples include fleet fueling, farming operations, manufacturing locations, and processing facilities. As will be described in more detail below, the gas handling section 12 includes gas handling equipment for controlling a flow of gas from storage, through the dispenser 10, and to a container removeable from the fueling station 11. Also described in more detail below is that the electronics section 14 contains electrical hardware and software for monitoring and recording an amount of gas dispensed, and optionally for monitoring and processing payment of gas purchased. Further in the example of FIG. 1, the electronics section 14 is disposed in a headspace portion 17 shown included within the frame 16. The headspace portion 17 does not extend into the gas handling section 12. As shown, the gas handling section 12 and the body of the frame 16 are in a Class I, Division I zone or area per code. Example codes include those created by the National Fire Protection Association (such as NFPA 52), the National Electrical Code (such as NEC §§500), and provided by 29 CFR §1910.307. Further illustrated is a zone 18 surrounding the dispenser 10, where most applicable codes designate the zone 18 and the headspace portion 17 (including the electronics section 14) as Class I, Division 2; meaning under normal operating conditions, combustible gas, or other flammable substance would not be present in sufficient quantity/concentration to introduce a risk of combustion. In some examples, zone 18 extends at least 5 feet from the outer periphery of the frame 16. Unlike the more restrictive Class I, Division 1 area, placing arc capable electronics in a Class I, Division 2 area does not violate code, if under normal or expected operating conditions the electronics do not produce an arc having sufficient energy to initiate combustion.

In one example, a vapor barrier between the gas handling section 12 and the electronics section 14 removes paths of fugitive gas flow between these sections 12 and 14. As such, electronics section 14 is not in a Class I, Division 1 zone as specified in the code. Instead the electronics section 14 is designated as a Class I, Division 2 zone per code. The less restrictive Class I, Division 2 zone definition expands the options of electronics that can be in electronics section 14. For example, absent isolating gas handling section 12, to comply with code, electronics in section 14 must be protected by an explosion-proof housing, and ISB circuit, or an air purge system. Instead, by isolating electronic section 14 in a separate housing whose structure is independent from the gas handling housing, code compliance for a Class I, Division 2 zone is achieved without the use of explosion-proof enclosures, an ISB or an air purge system.

FIG. 2 illustrates a front cut away view of an example of the dispenser 10 of FIG. 1. Here a supply line 20 is shown in the gas handling section 12 for transporting a flow of gas from a gas supply 21 to a nozzle line 22 that attaches to an outer surface of the dispenser 10. Examples of the gas include compressed gas, compressed natural gas (CNG), any gas lighter than air, any combustible gas, any combustible gas lighter than air, and combinations thereof In an example, the nozzle line 22 has an attachment at its free end for connection to a vehicle 23 for refueling the vehicle 23. Although the vehicle 23 is illustrated as an automobile, the dispenser 10 can supply any device or system that uses fuel to operate. Optionally, the nozzle line 22 can be used for filling a vessel in which CNG is stored. A valve 24 is further shown in FIG. 2 for controlling the flow of fluid through line 20. The valve 24 is shown having an actuator 25 selectively driving the valve 24 to open and closed positions, and all positions between open and closed. Further illustrated is that the actuator 25 is in communication with a control box 26, which in an example is a sealed container having electrical connections for electrical leads in the gas handling section 12. Electrical conduits 28, 30 are shown that extend from the control box 26 and through a bulkhead 32 in the frame 16. In an example, the bulkhead 32 is generally sealed and forms a vapor barrier that blocks a free flow of fugitive gas. In one embodiment, the bulkhead 32 defines a border of the gas handling section 12. The outer periphery of the bulkhead 32 is positioned against an inner surface of the frame 16 to define an interface 33. Alternate examples of the gas handling section 12 include any embodiment for controlling, regulating, or otherwise managing a flow of gas through the frame 16.

A housing 34 is illustrated in the frame 16 in a space that is on a side of the bulkhead 32 opposite the gas handling section 12. In the example of FIG. 2, the housing 34 is generally rectangular and mounts on a bulkhead 35 to "float" in the frame 16. Like bulkhead 32, bulkhead 35 defines a vapor barrier that blocks a free flow of fugitive gas, and whose structure may be the same or similar to bulkhead 32. As shown, the outer periphery of the housing 34 is set inward from the inner surface of the frame 16, and spaced upward from the bulkhead 32. Alternate embodiments include mounting housing 34 directly to inner surface of frame 16. In an embodiment, housing 34 functions as a vapor barrier and blocks a free flow of non-pressurized fugitive gas. In this example, fugitive gas that may be present in the head space 17 is blocked by the housing 34 from becoming in contact with electronics in the housing 34. As such, by providing a vapor barrier between the gas handling section 12 and the electronics section 14, electronics capable of arcing, but that do not normally arc, can be put in the electronics section 14 without violating applicable codes. Examples exist wherein structure described herein functions as a vapor barrier, and yet is not air tight. Machined flat washers 36 are shown around the conduits 28, 30 where they pass through bores in bulkheads 32, 35. Fasteners 38 maintain the washers 36 in place and against the upper and lower surfaces of the bulkheads 32, 35 to form metal to metal seals. Example printed circuit boards 40, 42 are illustrated in the housing 34 as well as an example power supply 44. Conduits 28, 30 provide a protective housing for wires 46, 48 that connect to boards 40, 42 and that may be in communication with components disposed in the gas handling section 12. A polymer (not shown), or other flowable material, may be set inside conduits 28, 30 for protecting any wires or lines therein. Seals (not shown) may be included in the intersections between conduits 28, 30 for ensuring isolation between the electronics section 14 and frame 16 and gas handling section 12. In an alternate embodiment, conduits 28, 30 may mount on a lateral side of housing 34 and may optionally intersect a sidewall of gas handling section 12. An optional air gap 49 is shown formed between the upper surface of bulkhead 32 and lower surface of housing 34, and in which conduits 36, 38 are disposed.

In the example of FIG. 2, boards 40, 42 are powered by power supply 44 and include circuitry and/or processors configured for card reading functions, or other functions for handling a transaction of CNG sales. Control of the valve 24 or safety functions may also be performed by hardware or software embedded in the boards 40, 42. Further, as the gas handling section 12 is isolated from the housing 34, the boards 40, 42 in the electronics section 14 can be designated for use in a Class I, Division 2 zone rather than the more stringent Class I, Division 1 zone. In one example, isolating the electronics section 14 in the housing 34 from the gas handling section 12 includes blocking any continuous flow paths between sections 12, 14. An advantage of disposing the electronics section 14 within the frame 16 and suspended proximate to the gas handling section 12 and optionally separated from it by gap 49 is that the dispenser 10 can maintain the appearance of a traditional dispenser while still complying with applicable regulations. An advantage of the present disclosure is that an air tight seal or housing is not required for the electronics in the electronics section 14 to achieve isolation.

Further illustrated in the example of FIG. 2 are vents 50 formed through side columns 52 that extend along opposing lateral sides of the structure 10. Openings 53 are shown through a sidewall of frame 16 adjacent the gas handling section 12 that provide communication from inside gas handling section 12 into a vertically extending space in each side columns 52. In the example of FIG. 2, fugitive gas from the gas handling components (e.g. valve 24, line 20, fittings, etc.) in the gas handling section 12 can flow from gas handling section 12, through the openings 53, and into the side columns 52. As bulkhead 32 is a vapor barrier, it prevents direct upward flow of the fugitive gas. The side columns 52 form an upward flow path for any of these fugitive gases that may leak from the gas handling section 12. The vents 50 provide communication from the side columns 52 to the space ambient to the structure 10 which is a location remote from and above the electronics section 14. As such, the combination of the bulkhead 32, openings 53, side columns 52, and vents 50 further protect against fugitive gas from entering into the electronics housing 34.

Shown in a perspective partially exploded view in FIG. 3, is an embodiment of the frame 16 where the side columns 52 include side walls 54, 55 that extend substantially the height of the frame 16 on opposing lateral sides. Elongate thin walled panels 56, 57 are respectively positioned over and set back from side walls 54, 55 to form the vertically extending space in each side column 52. In the example of FIG. 3, vents 50 are louvered openings provided proximate the upper terminal ends of panels 56, 57 and openings 53 are in side walls 54, 55 (shown in dashed outline in side wall 55) below bulkhead 32. Rear wall 58 is on a rearward side of frame 16 and adjacent the gas handling section 12. Forward wall 59, shown partially cut-away, is on a forward side of the frame 16 and adjacent gas handling section 12. frame 16. Referring back to FIG. 2, bulkhead 32 is shown having a substantially planar mid-portion 62 oriented generally transverse to side walls 54, 55, 58, 59. The outer periphery of the bulkhead 32 angles perpendicular to mid-portion 62 to define side surfaces that contact respective side walls 54, 55, 58, 59 along interface 33. Thus the bulkhead 32 extends across opposing inner surfaces of the frame 16. Referring back to FIG. 3, lateral side walls and a lower wall of the housing 34 are shown mounted in frame 16, with the lateral side walls set inward from side walls 54, 55 of cabinet 16 to form an air gap between housing 34 and frame 16. Further illustrated in FIG. 3 are bores 74, 76 through the lower wall of the housing 34 receiving the conduits 28, 30 of FIG. 2.

Embodiments of the present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, embodiments exist where compliance with applicable codes is maintained by providing a single vapor barrier (one or more of bulkheads 32, 35 or housing 34) between the gas handling and electronic sections 12, 14. These and other similar modifications will readily suggest themselves to those skilled in the art, and are intended to be encompassed within the spirit of the present invention disclosed herein and the scope of the appended claims.

What is claimed is:

1. A dispenser for use with a combustible gas comprising:
   A frame;
   A gas handling section in the frame in communication with a supply of combustible gas; and
   An electronics section in the frame above the gas handling section, the electronics being in signal communication with the gas handling section;
   A vapor barrier in the frame that defines an obstacle to a free flow of fugitive gas to within the electronics section; and
   A vent system in which the fugitive gas from the gas handling section selectively bypasses the electronics section, the vent system including at least one vent disposed above the electronics section; and
   Wherein the vent system comprises vertical open spaces housed in side columns on lateral sides of the frame and; openings that extend through sidewalls of the gas handling section and that intersect with the vertical open spaces so as to define the at least one vent in the side columns on a side of the electronics section opposite the gas handling section, wherein the side columns define a communication path between the vertical open spaces and an ambient space.

2. The dispenser of claim 1, wherein the vapor barrier comprises a bulkhead mounted in the frame.

3. The dispenser of claim 2, wherein the bulkhead is in the gas handling section.

4. The dispenser of claim 2, wherein the bulkhead is in the electronics section.

5. The dispenser of claim 1, wherein the vapor barrier comprises a housing in the electronics section, and wherein electronics are disposed in the housing such that only during unexpected conditions are the electronics capable of producing an arc having sufficient energy to initiate combustion.

6. A dispenser for handling a combustible gas comprising:
   a cabinet;
   a gas handling section in the cabinet that comprises a line in communication with a source of combustible gas, and that is in selective communication with a nozzle outside of the cabinet;
   an electronics section in the cabinet;

a first bulkhead in the gas handling section that defines a first vapor barrier that prevents exit of fugitive combustible gas from the gas handling section;

a second bulkhead in the electronics section that defines a second vapor barrier that prevents entry of the fugitive combustible gas into the electronics section; and a housing in the electronics section having electrical hardware disposed therein and that defines a third vapor barrier that prevents entry of the fugtive combustible gas in the electronics section.

7. The dispenser of claim 6, having electrical hardware that can produce an arc having sufficient energy to initiate a combustion only during unexpected operation.

8. The dispenser of claim 6, further comprising an air gap between the gas handling section and the housing and an air gap between side wall of the cabinet and the housing.

9. The dispenser of claim 6, wherein the gas is lighter than air.

10. The dispenser of claim 1, wherein the vent system comprises the side columns disposed at opposite sides of the frame; and openings extending through sidewalls of the gas handling section such that fugitive combustible gas that leaks from the gas handling section exits through the at least one vent while bypassing the electronics section.

11. The dispenser of claim 1, wherein the side columns are disposed at opposite sides of the frame, the side columns being formed by inner side walls and outer panels, the inner side walls extending at the opposite sides of the frame and each of the outer panels being positioned over and offset from a respective one of the inner side walls so as to form the vertical open spaces.

12. The dispenser of claim 11, wherein the at least one vent is formed at an upper end of the outer panels.

13. The dispenser of claim 1, wherein the vapor barrier comprises a first bulkhead in the gas handling section, a second bulkhead in the electronics section, and a housing in the electronics section.

14. The dispenser of claim 1, wherein the at least one vent comprises louvered openings.

15. The dispenser of claim 2, wherein the electronics section is encompassed within a housing that is disposed above the bulkhead.

16. The dispenser of claim 6, wherein the housing in the electronics section is a separate component from the second bulkhead.

17. The dispenser of claim 6, wherein the housing in the electronics section encompasses an enclosed space having the electrical hardware disposed therein, the second bulkhead being outside of the housing.

18. The dispenser of claim 6, wherein the housing in the electronics section is mounted over the second bulkhead.

* * * * *